ically melted at 90-2° C.  Calc. for $C_{12}H_{10}O_4N_2$: C,

United States Patent Office 2,989,530
Patented June 20, 1961

2,989,530
N-(5-NITRO-2-FUROYL)-MORPHOLINE
Horace D. Brown, Plainfield, Alexander R. Matzuk, Colonia, and Lewis H. Sarett, Princeton, N.J., assignors to Merck & Co., Inc., Rahway, N.J., a corporation of New Jersey
No Drawing. Filed Dec. 29, 1958, Ser. No. 783,205
1 Claim. (Cl. 260—247.7)

This invention relates to 5-nitro-2-furamides, and has for its object the provision of the new compounds N-benzyl-5-nitro-2-furamide, and N-(5-nitro-2-furoyl)-morpholine which have pronounced chemotherapeutic properties as will be explained hereinafter, and a process for producing the compounds. The new compounds have been found to have broad spectrum in vitro antibacterial activity. In addition the compounds have been found to be active against *Trichomonas foetus* in vitro and in vivo.

The compounds of the invention may be prepared effectively from 5-nitro-2-furoic acid, phosphorus pentachloride and the desired amine. The preliminary reaction in the formation of these compounds is understood to take place as follows:

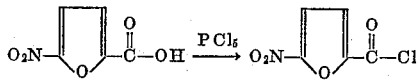

The N-benzyl derivative is formed by reacting the 5-nitro-2-furoyl chloride with benzyl amine, and the morpholine derivative is formed by reacting this chloride with morpholine.

The following examples illustrate an effective process for producing the new compounds:

Example I 5-nitro-2-furoyl chloride was prepared by mixing 58 g. of 5-nitro-2-furoic acid and 76 g. of phosphorus pentachloride and heating the mixture on a steam bath (with stirring) for from one to two hours. Then the phosphorus oxychloride that formed was distilled in vacuo. To the 5-nitro-2-furoyl chloride that formed was added with stirring and cooling an ether solution containing 80 g. of benzyl amine. The reaction mixture was then heated to reflux for 1 hour. After pouring the material onto crushed ice the organic phase was separated and the aqueous layer was extracted with benzene and chloroform. The combined organic fractions were then washed with dilute hydrochloric acid, sodium bicarbonate solution and dried over magnesium sulfate. Removal of the solvent left 97 g. of a light straw-colored product, N-benzyl-5-nitro-2-furamide. After recrystallization from absolute alcohol the product of analytical purity melted at 90–2° C. Calc. for $C_{12}H_{10}O_4N_2$: C, 58.53; H, 4.09; N, 11.38. Found: C, 58.82; H, 4.15; N, 11.51.

Example II

One hundred mls. of an ether solution of 5-nitro-2-furoyl chloride (prepared as indicated in Example I) was added to a cold, stirring solution of 11 gms. of morpholine in 100 ml. ether. The precipitate was filtered, washed with water, dilute hydrochloric acid solution and then with sodium bicarbonate solution. The compound N-(5-nitro-2-furoyl)-morpholine was then recrystallized from ethanol, m.p. 115–117° C.

The new compounds were tested to demonstrate their antiprotozoa activity in connection with *Trichomonas foetus* infection in mice as follows:

Mice were challenged interperitoneally with a sufficient number of *Trichomonas foetus* organisms to give about 85% mortality of the non-treated controls in 14 days. Twenty-four hours after the infection the test compounds were administered by stomach tube once daily for four days. During the fourteen-day period any dead animal was examined for the presence of organisms in the peritoneal cavity. At the end of the test period all survivors were likewise examined. 2-acetylamino-5-nitrothiazole was used as a positive control and a dose of at least 50 mg./kg. was required for control of the infection. The statement of activity implies that all animals in a treated group survived the test period and when examined showed no infection.

The reported activity of the compounds is as follows:
N-benzyl-5-nitro-2-furamide active 100–200 mg./kg.
N-(5-nitro-2-furoyl)-morpholine acitve 25 mg./kg.

We claim:
N-(5-nitro-2-furoyl)-morpholine.

References Cited in the file of this patent

UNITED STATES PATENTS 2,319,481   Stillman et al. _____ May 18, 1943
2,726,241   Gever et al. _____ Dec. 6, 1955

OTHER REFERENCES

Dann et al.: "Chemical Abstracts," vol. 41, p. 3090 (1947).
Dodd et al.: "J. Am. Pharm. Assoc.," vol. 39, page 314 (1950).
Shpanir et al.: "Chemical Abstracts," vol. 44, page 747g (1950).